(12) United States Patent
Muftic et al.

(10) Patent No.: US 12,262,088 B2
(45) Date of Patent: Mar. 25, 2025

(54) INTERACTIVE POINT-OF-VIEW VIDEO SERVICE

(71) Applicant: Mirza Muftic, Zagreb (HR)

(72) Inventors: Mirza Muftic, Zagreb (HR); Vedran Vukman, Zagreb (HR)

(73) Assignee: Mirza Muftic, Zagreb (HR)

( * ) Notice: Subject to any disclaimer, the term of this patent is extended or adjusted under 35 U.S.C. 154(b) by 0 days.

(21) Appl. No.: 14/688,856

(22) Filed: Apr. 16, 2015

(65) Prior Publication Data

US 2015/0304719 A1 Oct. 22, 2015

Related U.S. Application Data

(60) Provisional application No. 61/980,517, filed on Apr. 16, 2014.

(51) Int. Cl.
*H04N 21/472* (2011.01)
*A63F 13/00* (2014.01)
*H04N 21/2187* (2011.01)

(52) U.S. Cl.
CPC ........... *H04N 21/472* (2013.01); *A63F 13/00* (2013.01); *H04N 21/2187* (2013.01)

(58) Field of Classification Search
CPC ............. H04N 21/472; H04N 21/4126; H04N 21/2187; H04N 21/4223; H04N 21/4788; H04N 21/21805; H04N 21/47202; G06Q 10/10; G06Q 90/00; H04L 12/1822; H04L 12/1859
USPC ..... 725/38–39, 78, 134, 139, 32; 348/E7.06, 348/376, 62, E7.088; 709/238
See application file for complete search history.

(56) References Cited

U.S. PATENT DOCUMENTS

| | | | |
|---|---|---|---|
| 8,997,167 B1 * | 3/2015 | Bliss | H04N 21/4223 725/115 |
| 9,277,179 B1 * | 3/2016 | Fulay | H04N 7/15 |
| 9,467,515 B1 * | 10/2016 | Penilla | G06F 3/04842 |
| 2001/0033332 A1 * | 10/2001 | Kato | G08B 13/19693 348/211.99 |
| 2002/0010584 A1 * | 1/2002 | Schultz | G06Q 99/00 704/270 |
| 2003/0163339 A1 * | 8/2003 | Elliot | G06Q 10/10 725/32 |
| 2004/0119814 A1 * | 6/2004 | Clisham | H04N 21/440281 348/14.08 |
| 2005/0033860 A1 * | 2/2005 | Muhonen | H04W 76/12 709/238 |

(Continued)

FOREIGN PATENT DOCUMENTS

WO WO 2008083459 * 7/2008

OTHER PUBLICATIONS

Forget-Me-Now—Arrested Development Wiki, Oct. 3, 2005, 6 pgs., http://arresteddevelopment.wikia.com/wiki/Forget-Me-Now.

(Continued)

*Primary Examiner* — Jason Salce
(74) *Attorney, Agent, or Firm* — ROSSI, KIMMS & McDOWELL LLP

(57) ABSTRACT

A system, an apparatus and a method for an interactive point-of-view video service are disclosed. In an embodiment, a method includes selecting, from a remote location, an electronic device to capture a point-of-view (POV) video of an event and controlling, from the remote location, the electronic device as the electronic device captures the POV video.

16 Claims, 1 Drawing Sheet

(56) References Cited

U.S. PATENT DOCUMENTS

| | | | | |
|---|---|---|---|---|
| 2005/0251821 A1* | 11/2005 | Pina | ............. | H04N 21/4126 725/39 |
| 2007/0157281 A1* | 7/2007 | Ellis | ............. | H04N 7/17309 725/134 |
| 2008/0022322 A1* | 1/2008 | Grannan | ............. | H04N 5/44591 725/78 |
| 2008/0134258 A1* | 6/2008 | Goose | ............. | H04L 67/108 725/91 |
| 2009/0033736 A1* | 2/2009 | Thomason | ............. | H04N 7/147 348/14.02 |
| 2009/0044235 A1* | 2/2009 | Davidson | ............. | H04N 21/4828 725/87 |
| 2009/0099836 A1* | 4/2009 | Jacobsen | ............. | G06F 17/289 704/3 |
| 2009/0252481 A1* | 10/2009 | Ekstrand | ............. | H04N 5/772 386/239 |
| 2010/0020229 A1* | 1/2010 | Hershey | ............. | H04N 5/2251 348/376 |
| 2012/0303834 A1* | 11/2012 | Adam | ............. | H04N 21/6377 709/231 |
| 2013/0005294 A1* | 1/2013 | Levinson | ............. | G08B 25/005 455/404.1 |
| 2014/0137204 A1* | 5/2014 | Vitzthum | ............. | H04N 21/63345 726/4 |
| 2014/0149522 A1* | 5/2014 | Mok | ............. | H04L 51/04 709/206 |
| 2015/0312050 A1* | 10/2015 | Warren | ............. | H04N 7/186 348/14.04 |
| 2015/0312289 A1* | 10/2015 | Shen | ............. | G06Q 50/01 709/204 |

OTHER PUBLICATIONS

Larry Middleman—Arrested Development Wiki, Oct. 3, 2005, 4 pgs., http://arresteddevelopment.wikia.com/wiki/Larry_Middleman.

* cited by examiner

| POV EVENT | PLACE | TIME | STREAMER | COST |
|---|---|---|---|---|
| EVENT 1 | STADIUM | 8:00 | A | $ |
| EVENT 1 | STADIUM | 8:00 | B | $$ |
| EVENT 1 | STADIUM | 8:00 | C | $$ |
| EVENT 2 | FIELD | 2:00 | A | $ |
| EVENT 3 | SHOWROOM | 10:00 | A | $ |
| EVENT 3 | SHOWROOM | 3:00 | D | $$ |
| EVENT 4 | BUILDING A | 1:00 | E | $$ |
| EVENT 5 | BUILDING B | 2:00 | F | $$$ |
| EVENT 6 | BUILDING C | 4:00 | G | $ |

INTERACTIVE POINT-OF-VIEW VIDEO SERVICE

This application claims the benefit of U.S. Provisional Application No. 61/980,517, filed on Apr. 16, 2014, which application is hereby incorporated herein by reference.

TECHNICAL FIELD

This disclosure relates in general to the field of video services and, more particularly, to an interactive point-of-view video service.

BACKGROUND

Some current electronic devices (e.g., an optical head-mounted display (OHMD) or some other similar type device) can record video for streaming or for storage within the electronic device for upload to a computer. The electronic device it typically worn by the person recording the video while a viewer of the video passively watches the video from a remote location. Often, the time between the recording of the video and the time the video is watched can be hours or even days.

SUMMARY

In accordance with a preferred embodiment of the present invention, a method commprises selecting, from a remote location, an electronic device to capture a point-of-view (POV) video of an event and controlling, from the remote location, the electronic device as the electronic device captures the POV video.

BRIEF DESCRIPTION OF THE DRAWINGS

Embodiments are illustrated by way of example and not by way of limitation in the FIGURES of the accompanying drawings, in which like references indicate similar elements and in which.

DETAILED DESCRIPTION OF ILLUSTRATIVE EMBODIMENTS

Figures 1, 2:
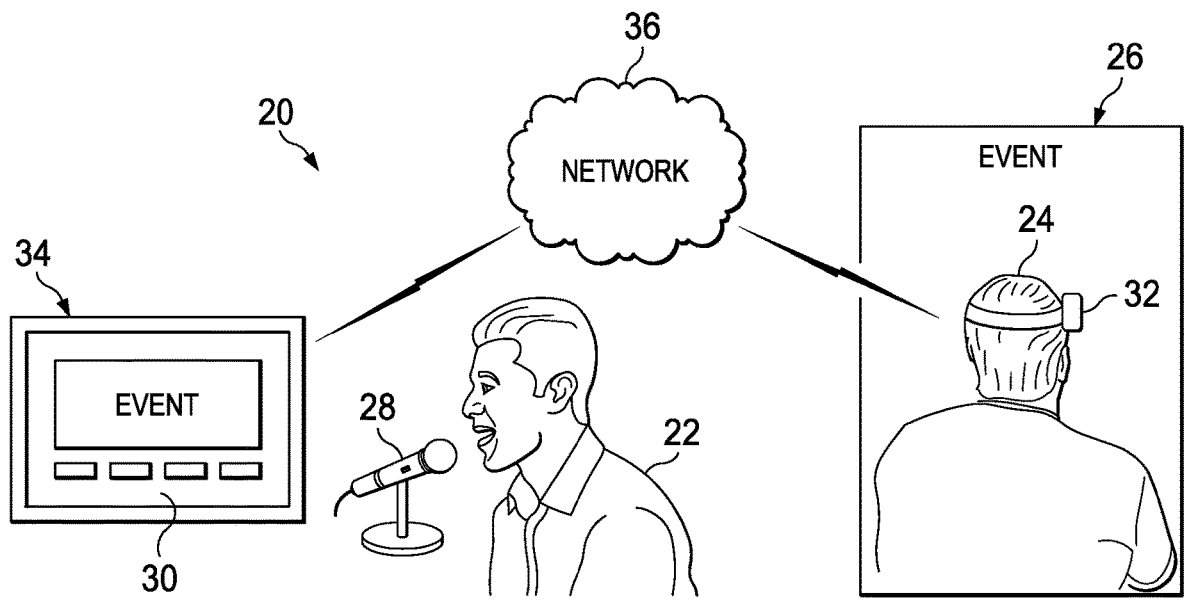
FIG. 1 is a simplified block diagram illustrating an embodiment of a portion of an interactive point-of-view video service, in accordance with one embodiment of the present disclosure.
FIG. 2 is a simplified schematic diagram illustrating an embodiment of an electronic device in a closed clamshell configuration, in accordance with one embodiment of the present disclosure.

In today's busy world, sometimes a person needs to be in two (or more) places at the same time. Other times, a person may need to travel to a location just to see or observe something or someone. Often, travel to the location can be expensive (travel fares, travel expenses, etc.), time consuming, and reduce productivity. In addition, in the sale of goods, travel to the customer (or the customer traveling to the point-of-sale) is often required, as customers are often not engaged when they are a distance away from the point of sale. What is needed is a service where a person can create a live point-of-view (POV) event and users or customers can experience the event.

In one example embodiment, a POV service can be configured for streaming live POV video from a streamer to a user and allow for two-way audio communication between the streamer and the user. The POV video may be oneway video from the streamer to the user. The streamer can be equipped with an optical head-mounted display (OHMD), a streaming video camera, wearable video camera, or some other similar type device that can provide video and/or audio to the user. The term "streamer" includes a person in the real world (or an extension of the person) streaming POV video of an event (e.g., a person or individual wearing an OHMD and streaming POV video of an event). The streamer can be similar to a live human avatar. A user can see what the streamer sees and hear what the streamer hears. During a POV event, a user can control the streamer's actions using voice commands, digital cues or prompts, or some other means for controlling the streamer's actions. For example, when using voice commands, a user may instruct a streamer to pick up an object, look at a building, walk over to the edge of a street, etc.

A user interface can be configured to allow users or companies to create or participate in a live POV event with one or more streamers creating POV video and participating or interacting with the users. The POV event can be located in almost any environment or geographical location. The POV event may be of any sort of event or service that can be live streamed such as an educational event, social event, gaming event, tutoring service, point of sale service, etc. as well as many different business uses (e.g., point-of-sale event, real estate, remote repairs, construction, shopping, etc.). The event can be selected or setup by a user and the user can choose which streamer (if more than one streamer is available for the event) will be controlled by the user. The POV event can last almost any amount of time and the cost for the POV even may be calculated per minute, per hour, free, etc., so that the streamer can be rewarded by a user for the time being controlled by the user.

In one example, the POV video can be streamed to many users. If the POV video is streamed to many users, one user may be authorized to have audio communication with the streamer and control the streamer. In another example, only a select few authorized users may have audio communication with the streamer. The other users who do not have authorization are without the privilege or ability to command the streamer. In some examples, the privilege or authorization to command the streamer may be changed or passed from one user to another during a POV event.

The interactive POV service can be configured to offer both parties (streamers and users) convenience and profit. Streamers can utilize whatever POV streaming hardware they own to "sell" their time, talent, and expertise to POV events. Users on the other end, experience these sessions in an "as if they were there" kind of experience and can save money by reducing travel expenses, increasing productivity, etc.

At the user interface, customers can sign-up and choose if they want to be streamers or users, or both. Numerous filters can allow a user to browse through content, type of event, specific type of streamer, etc. and choose specific events, places, streamers, etc. At the user interface, various POV events can be organized as top free POV events, top paid POV events, featured POV events, assistants for hire, etc. The user interface can also allow the user to make future appointments for streamers.

The POV service can be used to create live events of almost any kind. In a specific example, a live poker game with 8 streamers (with POV cameras) siting at a poker table can be created. Each streamer can be controlled by a user from anywhere in the world. The real people, real cards, and a real poker room allow the user to play poker as if they were there in person.

To illustrate a business application, sales personnel may be equipped with POV cameras and the sales people may be streamers. By using sales people as streamers, users that do not feel like going to a showroom can experience the store and consumer products as if they were there in person. For example, if the consumer product was a car, a user could sit on their couch and instruct a streamer to go over to a red car, pop the trunk, sit inside, open the glove compartment, and so on. Such an experience could engage the customer (user) in a unique and personalized way.

Features in the following figures, such as structure(s), function(s), and/or characteristic(s) for example, are described with reference to one example as a matter of convenience; various examples may be implemented with any suitable one or more described features or with other features.

FIG. 1 is a simplified diagram illustrating an example of a user interface 10 that can be used to select a POV event. User interface 10 can be configured to display information related to one or more POV events. For example, as illustrated in FIG. 1, user interface 10 may display available events (or only one event), places for the events, times for the events, any streamers available for the events, and the cost for a POV video of the event. Other types of information may be displayed or the illustrated information may be displayed differently. A user can view the information and select a POV event they wish to participate.

Turning to FIG. 2, FIG. 2 is an illustrative example of one aspect of POV service 20. As illustrated in FIG. 2, a user 22 is participating in a POV event 26 through a streamer 24 wearing a streaming video camera 32. User 22 can control streamer 24 using a user interface 30 on a remote device 34. User 22 and streamer 24 can be connected through a network 36. In a specific example, user interface 30 can be connected to a microphone 28 and microphone 28 can allow user 22 to communicate commands to streamer 24 such that user can interact with POV event 26 using streamer 24 and user interface 30.

POV service 20 can serve as a link between streamer 24 (e.g., people, extensions, individuals, etc. wearing a head mounted camera and streaming their POV video) and user 22 (e.g., people that see what the streamers see, hear what they hear and at the same time control the actions of the streamers) and allow user 22 to be at two or more places at the same time. POV service 20 can also include a platform (e.g., user interface 10 or 30) where streamers can set-up their POV streams of an event and users can experience and participate in the event. Streamers can hold POV courses in cooking, painting, math, etc. or be live POV personal assistants for hire. The possible applications are virtually limitless. POV service 20 can also allow streamers to create and publish interactive POV events on an interactive user interface (e.g., user interface 10 or 30), choose if they want to be controlled by a single user, or just stream their POV video to many users. Streamers can set a price for those sessions on a per-minute, hour, etc. basis. In one implementation, when a specific business wants to use a streamer, the business can go through a customized user interface configured for the specific business.

In one implementation, network elements/devices can include software to achieve (or to foster) the activities discussed herein. This could include the implementation of instances of any of the components, engines, logic, etc. shown in the figures. Additionally, each of these devices can have an internal structure (e.g., a processor, a memory element, etc.) to facilitate some of the operations described herein. In other embodiments, these activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying figures (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flows illustrate only some of the possible signaling scenarios and patterns that may be executed by, or within, communication systems shown in the figures. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the figures in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:

selecting, from a first electronic device associated with a user, at a first remote location, a streamer from a table displayed on the first electronic device, the table comprising a list of streamers and a list of streaming events;

selecting, from a third electronic device associated with another user, at a second remote location, the streamer from a table displayed on the third electronic device, the table comprising a list of streamers and a list of streaming events;

selecting, from the first electronic device, a streaming event from the list of streaming events, the streamer being available to capture a point-of-view (POV) video of the selected streaming event with a second electronic device;

selecting, from the third electronic device, the streaming event from the list of streaming events, the streamer being available to capture a point-of-view (POV) video of the selected streaming event with the second electronic device;

connecting, from the first electronic device at the first remote location, to the second electronic device so that the second electronic device is selectively connected for audio and video communication to the first electronic device;

connecting, from the third electronic device at the second remote location, to the second electronic device so that the second electronic device is selectively connected for audio and video communication to the third electronic device;

controlling, via the first electronic device at the first remote location, the streamer operating the second electronic device such that the streamer operates the second electronic device to capture the POV video at the streaming event;

controlling, via the third electronic device at the second remote location, the streamer operating the second electronic device such that the streamer operates the second electronic device to capture the POV video at the streaming event;

wherein controlling the streamer includes sending audio signals but not video signals from at least one of the first electronic device at the first remote location and the third electronic device at the second remote location to the second electronic device such that the streamer operates the second electronic device to capture the POV video at the streaming event, wherein i) a first number of electronic devices are allowed to view the (POV) video of the selected streaming event, ii) a few electronic devices of the first number of electronic devices are authorized to have audio communications with the streamer at the second electronic device during the streaming event, and iii) control of the streamer at the second electronic device is passed from the first electronic device to the third electronic device during the selected (POV) streaming event, wherein control of the streamer includes sending audio signals but not video signals to the streamer such that the streamer operates the second electronic device to capture the POV video at the streaming event, and wherein the table includes one or more rows, each row simultaneously including a parameter related to an event, and a parameter related to a streamer allocated to streaming the streaming event.

2. The method according to claim 1, wherein the table further comprises a list of parameters, each parameter associated with a streamer, and wherein a parameter is a measure for availability of the streamer.

3. The method according to claim 1, further comprising disconnecting the connection between the first and second electronic devices.

4. The method according to claim 3, further comprising rewarding the streamer by a user of the first electronic device only for a time being controlled by the user.

5. The method according to claim 1, wherein a streamer is allocated to several events at different times.

6. The method according to claim 1, wherein the second electronic device comprises a streaming video camera.

7. The method according to claim 6, wherein the streaming video camera is implemented in a headset, the headset including a microphone.

8. The method according to claim 1, wherein each row also simultaneously includes one or more of a parameter related to the event location, a parameter related to a starting time of the event, and a parameter related to a cost to have the event streamed.

9. A non-transitory computer readable medium storing programming for execution by a processor, the programming including instructions for:

selecting, from a first electronic device associated with a user at a first remote location, a streamer from a table displayed on the first electronic device, the table comprising a list of streamers and a list of streaming events;

selecting, from a third electronic device associated with another user, at a second remote location, the streamer from a table displayed on the third electronic device, the table comprising a list of streamers and a list of streaming events;

selecting, from the first electronic device, a streaming event from the list of streaming events, the streamer being available to capture a point-of-view (POV) video of the selected event with a second electronic device;

selecting, from the third electronic device, the event from the list of events, the streamer being available to capture a point-of-view (POV) video of the selected event with the second electronic device;

connecting, from the first electronic device at the first remote location, to the second electronic device so that the second electronic device is selectively connected for audio and video communication to the first electronic device;

connecting, from the third electronic device at the second remote location, to the second electronic device so that the second electronic device is selectively connected for audio and video communication to the third electronic device;

controlling, via the first electronic device at the first remote location, the streamer operating the second electronic device such that the streamer operates the second electronic device to capture the POV video at the streaming event;

controlling, via the third electronic device at the second remote location, the streamer operating the second electronic device such that the streamer operates the second electronic device to capture the POV video at the streaming event;

wherein controlling the streamer includes sending audio signals but not video signals from at least one of the first electronic device at the first remote location and the third electronic device at the second remote location to the second electronic device such that the streamer operates the second electronic device to capture the POV video at the streaming event, wherein
i) a first number of electronic devices are allowed to view the (POV) video of the selected streaming event,
ii) a few electronic devices of the first number of electronic devices are authorized to have audio communications with the streamer at the second electronic device during the streaming event, and
iii) control of the streamer at the second electronic device is passed from the first electronic device to the third electronic device during the selected (POV) streaming event, wherein control of the streamer includes sending audio signals but not video signals to the streamer such that the streamer operates the second electronic device to capture the POV video at the streaming event, and wherein the table includes one or more rows, each row simultaneously including a parameter related to an event, and a parameter related to a streamer allocated to streaming the streaming event.

10. The computer readable medium according to claim 9, wherein the table further comprises a list of parameters, each parameter associated with a streamer, and wherein a parameter is a measure for availability of the streamer.

11. The computer readable medium according to claim 9, further comprising instructions for disconnecting the connection between the first and second electronic devices.

12. The computer readable medium according to claim 11, further comprising instructions for rewarding the streamer by a user of the first electronic device only for a time being controlled by the user.

13. The computer readable medium according to claim 9, wherein a streamer is allocated to several events at different times.

14. The computer readable medium according to claim 9, wherein the second electronic device comprises a streaming video camera.

15. The computer readable medium according to claim 9, wherein each row also simultaneously includes one or more of a parameter related to the event location, a parameter related to a starting time of the event, and a parameter related to a cost to have the event streamed.

16. A device comprising: a processor; a non-transitory computer readable memory storing programming for execution by the processor, the programming including instructions for:

selecting, from a first electronic device associated with a user at a first remote location, a streamer from a table displayed on the first electronic device, the table comprising a list of streamers and a list of streaming events;
selecting, from a third electronic device associated with another user, at a second remote location, the streamer from a table displayed on the third electronic device, the table comprising a list of streamers and a list of streaming events;
selecting, from the first electronic device, an event from the list of streaming events so that the streamer is available to capture a point-of-view (POV) video of the selected streaming event with a second electronic device;
connecting, from the first electronic device at the first remote location, to the second electronic device so that the second electronic device is selectively connected for audio and video communication to the first electronic device; and
connecting, from the third electronic device at the second remote location, to the second electronic device so that the second electronic device is selectively connected for audio and video communication to the third electronic device;
controlling, via the first electronic device at the first remote location, the streamer operating the second electronic device such that the streamer operates the second electronic device to capture the POV video at the streaming event;
controlling, via the third electronic device at the second remote location, the streamer operating the second electronic such that the streamer operates the second electronic device to capture the POV video at the streaming event;
wherein controlling the streamer includes sending audio signals but not video signals from at least one of the first electronic device at the first remote location and the third electronic device at the second remote location to the second electronic device such that the streamer operates the second electronic device to capture the POV video at the streaming event, wherein
i) a first number of electronic devices are allowed to view the (POV) video of the selected streaming event,
ii) a few electronic devices of the first number of electronic devices are authorized to have audio communications with the streamer at the second electronic device during the streaming event, and
iii) control of the streamer at the second electronic device is passed from the first electronic device to the third electronic device during the selected (POV) streaming event, wherein control of the streamer includes sending audio signals but not video signals to the streamer such that the streamer operates the second electronic device to capture the POV video at the streaming event, and wherein the table includes one or more rows, each row simultaneously including a parameter related to an event, and a parameter related to a streamer allocated to streaming the event.

* * * * *